United States Patent [19]

Adamson

[11] 4,068,469

[45] Jan. 17, 1978

[54] VARIABLE THRUST NOZZLE FOR QUIET TURBOFAN ENGINE AND METHOD OF OPERATING SAME

[75] Inventor: Arthur P. Adamson, Cincinnati, Ohio

[73] Assignee: The United States of America as represented by the Administrator of the National Aeronautics and Space Administration, Washington, D.C.

[21] Appl. No.: 581,750

[22] Filed: May 29, 1975

[51] Int. Cl.² ............................................... F02K 3/06
[52] U.S. Cl. .................................. 60/204; 60/226 R; 60/271
[58] Field of Search ................. 60/226 R, 226 A, 224, 60/271, 242, 204; 181/33 HB

[56] References Cited

U.S. PATENT DOCUMENTS

| 2,934,966 | 5/1960 | Wood | 60/226 R |
|---|---|---|---|
| 3,060,680 | 10/1962 | Wilde et al. | 60/226 R |
| 3,261,164 | 7/1966 | Tumicki | 60/226 R |
| 3,401,524 | 9/1968 | Urban | 60/226 R |
| 3,484,847 | 12/1969 | Poole | 60/226 R |
| 3,514,952 | 6/1970 | Schumacher et al. | 60/226 R |
| 3,747,341 | 7/1973 | Davis | 60/226 A |
| 3,913,626 | 10/1975 | McMurtry | 60/226 R |

*Primary Examiner*—Carlton R. Croyle
*Assistant Examiner*—Robert E. Garrett
*Attorney, Agent, or Firm*—Norman T. Musial; Robert C. Lampe, Jr.; Derek P. Lawrence

[57] ABSTRACT

An improved method of operating a gas turbine engine is presented wherein engine-generated noise is maintained at a reduced level during reduced thrust operation. Fan speed is maintained at a constant level while fan nozzle area is increased. This maintains high inlet Mach numbers for reduced forward noise propagation and also permits reduced nozzle exhaust velocity for reduced shear noise. In another embodiment, airflow is increased by means of a fan blade pitch change or speed increase while the fan nozzle area is increased, yielding both a net reduction in engine thrust and noise.

9 Claims, 5 Drawing Figures

VARIABLE THRUST NOZZLE FOR QUIET TURBOFAN ENGINE AND METHOD OF OPERATING SAME

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to gas turbine engines and, more particularly, to an improved method of operating same for reduced noise levels.

Subsonic performance improvement of a jet engine may be obtained by incorporating a fan which is, in essence, analogous to a shrouded propeller. The fan is disposed in a duct and rotatably driven by a shaft connection with a core engine and serves to pass a large volume of air through the duct, thereby increasing overall thrust. Thrust is proportional to, among other parameters, the amount of air moved and its velocity. Though the velocity of the air exiting the fan duct is low compared to that exiting the core engine, the fan often moves many times as much air as the core engine and is, therefore, the most significant contributor to turbofan engine thrust.

Simply stated, the problem is that gas turbine engines make noise, sometimes more noise than is environmentally desirable. The noise sources are varied and complex, but two substantial contributors are blade passing noises propagating forward out of the engine inlet and the noises caused by the viscous shearing between the exhaust gases and the relatively quiescent surrounding atmosphere. Complete solution of the problem has been evasive, but much effort is being expended toward that goal. In particular, it is desirable to reduce engine noise while an aircraft is airborne and in close proximity to the ground, such as during approach and landing operations.

Ideally, a choked inlet (Mach number equals 1) would prevent engine internally generated noise such as blade passing noise, from propagating forward. The principle employed is that an acoustic wave cannot propagate upstream against a Mach one flow since the wave itself can only travel at Mach one. However, a choked inlet is inefficient and produces performance problems. Therefore, it is preferred to use high subsonic inlets which, though less effective acoustically, are more efficient aerodynamically. The lower the inlet Mach number, the less acoustic suppression in the forward direction. Thus, on aircraft approach when the engine is throttled back, two significant acoustic developments occur. First, since the exhaust velocity is decreased, the shearing noise diminishes. Secondly, however, the decreased inlet Mach number causes reduced forward noise suppression and a possible net increase in overall engine-generated noise levels.

The problem facing the engine manufacturer, therefore, is to develop a method of operating a gas turbofan engine in a reduced thrust mode wherein both inlet and exhaust-related noise are maintained at a reduced level.

SUMMARY OF THE INVENTION

Accordingly, it is the primary object of this invention to provide an improved method of operating a gas turbofan engine wherein noise is minimized during reduced thrust operation.

It is a further object of the present invention to provide a method of reducing gas turbofan engine thrust without increasing the engine noise level.

It is still a further object of this invention to reduce engine noise while holding engine thrust essentially constant.

These and other objects and advantages will be more clearly understood from the following detailed description, drawings and specific examples, all of which are intended to be typical of rather than in any way limiting on the scope of the present invention.

Briefly stated, the above objectives are accomplished, in one embodiment, by increasing the fan exhaust nozzle exit area while maintaining fan rotational speed. The inlet Mach number remains unchanged since the inlet airflow is constant, while the exhaust velocity (which is inversely proportional to fan nozzle exit area) is decreased. In another embodiment, fan airflow is increased by means of a fan blade pitch change or rotational speed increase while the fan nozzle area is increased in a compensating manner to yield both a net reduction in engine thrust and noise.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiments which is given by way of example with the accompanying drawings in which:

DESCRIPTION OF THE PREFERRED EMBODIMENT

Figure 1:
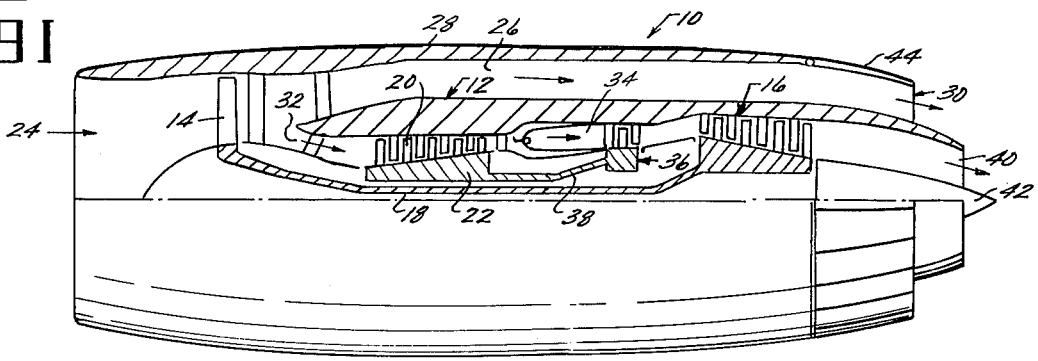
FIG. 1 is a simplified, cross-sectional view of a typical high bypass turbofan engine.

Referring the drawings wherein like numerals correspond to like elements throughout, reference is first directed to FIG. 1, wherein an engine depicted generally at 10 embodying the present invention is diagrammatically shown. This engine may be considered comprising generally a core engine 12, a fan assembly 14 and a fan turbine 16 which is interconnected to the fan assembly 14 by shaft 18. The core engine 12 includes an axial flow compressor 20 having a rotor 22. Air enters inlet duct 24 and is initially compressed by fan assembly 14. A first portion of this compressed air enters the fan bypass duct 26 defined, in part, by core engine 12 and a circumscribing fan nacelle 28 and discharges through a variable area fan nozzle 30. A second portion of the compressed air enters core engine inlet 32, is further compressed by the axial flow compressor 20 and then is discharged to a combustor 34 where fuel is burned to provide high energy combustion gases which drive a turbine 36. The turbine 36, in turn, drives the rotor 22 through a shaft 38 in the usual manner of a gas turbine engine. The hot gases of combustion then pass to and drive the fan turbine 16 which, in turn, drives the fan assembly 14. A propulsive force is thus obtained by the action of the fan assembly 14 discharging air from the fan bypass duct 26 through the fan nozzle 30 and by the discharge of combustion gases from a core engine nozzle 40 defined, in part, by plug 42. The above description is typical of many present-day gas turbine engines and is not meant to be limiting, as it will become readily apparent from the following description that the present invention is capable of application to any gas turbofan engine and is not necessarily restricted to gas turbine engines of the front fan, core engine driven variety. The foregoing description of the operation of the engine depicted in FIG. 1 is, therefore, merely meant to be illustrative of one type of application.

Figure 2:
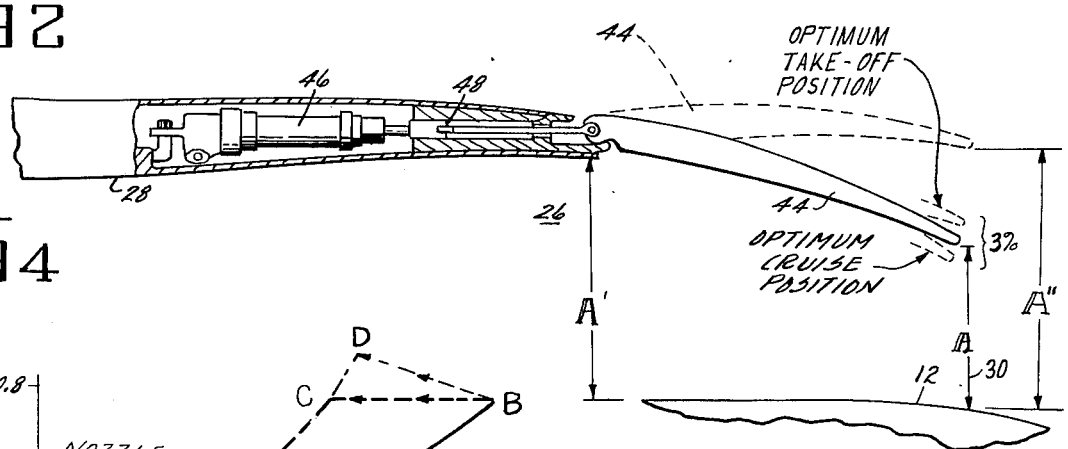
FIG. 2 is an enlarged view of the van nozzle portion of the engine of FIG. 1.

Referring now to FIG. 2 wherein the fan nozzle area of FIG. 1 is depicted in greater detail, it is shown that nozzle 30 is of the variable area variety and is defined by cooperating core engine 12 and flaps 44 which form the downstream extremity of the fan nacelle 28. Flaps 30 are positionable through a plurality of positions by means of any currently available actuating means 46 and linkage mechanism 48. A preferred arrangement for the flaps and actuating means is taught and claimed in co-pending U.S. patent application Ser. No. 573,029 which is assigned to the same assignee as the present invention and the disclosure of which is incorporated herein by reference.

Heretofore, engine thrust was changed by moving the engine throttle and thereby varying the fan and core engine rotational speeds, and by varying the pitch angle of the fan blades. In either of these methods, the engine thrust can be reduced from a maximum value only by reducing the amount of airflow through the fan. Consequently, with the reduction in airflow through inlet 24 there is a corresponding increase in amount of noise propagating forward from the inlet since the inlet Mach number has decreased. The principle employed is that an acoustic wave cannot propagate against a Mach one (sonic) flow. However, where the flow velocity is less than Mach one, the wave will propagate forward, but its velocity is reduced by opposing flow velocity as has been demonstrated.

In the present invention the thrust is reduced from a maximum value by opening the fan nozzle while maintaining the fan airflow level. Since thrust is proportional to both the amount of air moved and its velocity (among other parameters), and velocity is inversely proportional to area in subsonic flow, the reduction in nozzle flow velocity will reduce engine thrust. However, any thrust less than maximum will be developed with maximum fan flow, thus yielding a maximum inlet Mach number to prevent noise radiations out of the inlet. Typical gas turbofan engine fan nozzles are contoured such that there is an area convergence of approximately 30 percent between the area A' at the downstream end of the fixed duct portion of nacelle 28 (or, conversely, the generally constant area inlet to flaps 44) and the area A defined at the downstream end of movable nozzle flaps 44. Typically, where fixed fan nozzles are employed, the nozzle area is necessarily sized as a compromise between the optimum cruise position and the more open optimum take-off (T.O.) position (FIG. 2) of the flight envelope. Thus, in a fixed area nozzle, flaps 44 would not be movable and the fan area would be permanently fixed as that depicted as A, clearly a compromise between the take-off and cruise conditions. In a variable area fan nozzle such as that of FIG. 2 wherein flaps 44 are movable, the flaps are usually scheduled by a control means (not shown) between the optimum take-off and optimum cruise positions as a function of engine operating condition. Typically, the movement of flap 44 produces an area change no greater than about 3 percent of the compromised area denominated A. However, this small amount of variation is adequate to optimize engine performance throughout the flight envelope.

The present invention is directed toward a scheme wherein the nozzle flaps 44 are opened far in excess of any known nozzles and opened beyond that position dictated by optimum cycle considerations. In fact, an engine operating a nozzle in the manner of the present invention will not be as efficient in the approach mode as existing nozzle configurations, but it will be significantly quieter.

The method of operation according to the present invention includes opening the fan nozzle flaps 44 from their position shown by solid lines (and in which they define area A) in FIG. 2 to a reduced thrust position shown in phantom and having a larger area A" associated therewith. The area increase is at least 5 percent greater than the area A which would be established by fixed position nozzle flaps (i.e., convergence is limited to approximately 25 percent), and may be slightly greater than that area A' of the fixed duct portion of nacelle 28. This large increase in nozzle area and associated decrease in area convergence produces a rapid decrease in exhaust velocity which, in turn, significantly reduces overall engine thrust while producing a modest increase in airlet airflow. If the exhaust nozzle flaps 44 are opened up to an area greater than that of A', diffusion will occur through the variable flaps portion of the nozzle and it is possible that the pressure of the exhaust stream at the nozzle discharge plane would be less than the amibent pressure, in which case a negative thrust (or drag) would be produced. This phenomenon is most significant at high Mach numbers. To avoid flow separation through the variable flap portion of the nozzle, the maximum discharge area should be limited to value not much greater than that at the inlet to the variable position flap 44. As a result of increasing the nozzle area to a value significantly greater than A, the area of a comprised fixed position nozzle, the inlet velocity remains sustantially unchanged (since fan speed remains essentially constant) while exhaust velocity is reduced, thereby reducing exhaust shear noise.

Figure 4:
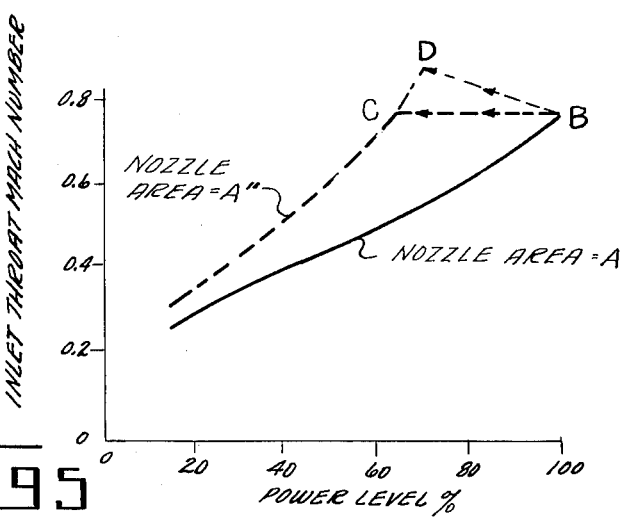
FIG. 4 is a graph depicting inlet Mach number as a function of engine thrust level with and without increased exhaust nozzle area.
Figure 5:
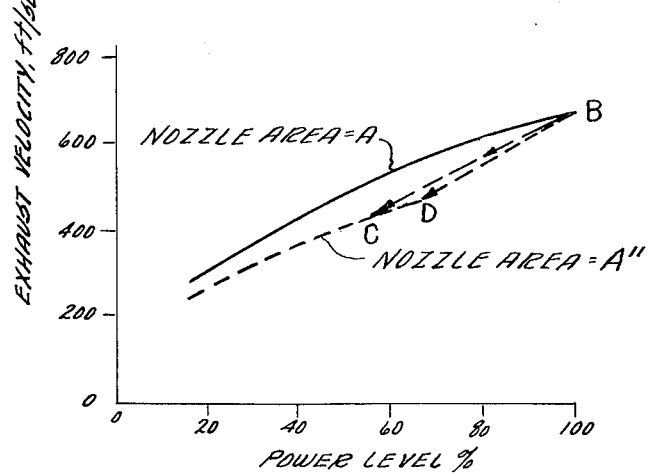
FIG. 5 is a graph, similar to FIG. 4, depicting exhaust duct velocity as a function of engine thrust level with and without increased exhaust nozzle area.

FIGS. 4 and 5 graphically depict the change in inlet Mach number and fan exhaust velocity, respectively, with changes in engine thrust level. As previously discussed, engines are designed at a maximum speed operating condition (usually take-off) with a corresponding optimum fan nozzle area. The solid lines of FIGS. 4 and 5 represent the locus of points as the throttle is retarded from the design point of 100 percent power level while holding the nozzle area at a representative constant value of A, for example. At the maximum power level, the fan flow is greatest and thus the inlet throat Mach number is maximized. Inlet throat Mach numbers in the order of .8 are considered maximum for efficient inlet recovery and performance.

In accordance with the present invention, when an aircraft is on landing approach and it is desired to reduce thrust, inlet Mach number and inlet noise suppression may be maintained at a given level by increasing the fan nozzle area to that of A" (FIG. 2) which is manifested by traveling along path B – C of FIG. 4. In this manner, the inlet throat Mach number remains essentially constant while thrust is reduced. If the throttle is retarded at constant area A", the inlet throat Mach number would track along a path typically represented by the dashed curve of FIG. 4.

Simultaneously, the exhaust velocity trend tracks along line B – C of FIG. 5 as the nozzle area is increased from A to A". Since the exhaust velocity migrates to a lower value, exhaust shear noise is reduced. Thus, it becomes apparent in FIGS. 4 and 5 that increasing the fan nozzle flow area reduces both engine thrust and engine noise.

A possibility exists for reducing noise levels even further. Though inlet Mach numbers in the order of .8 are typically considered maximum for efficient engine cruise operation, it may prove feasible to permit limited excursions to higher inlet Mach numbers since higher Mach numbers may be tolerated on approach where engine performance is compromised by acoustic considerations. For example, an increase in fan airflow may be accomplished through the use of a moderate throttle push (if mechanical considerations permit) or a change in pitch of variable pitch fan blades contemporaneous with an increase in fan nozzle area. A suitable variable pitch fan actuation system is described in copending U.S. patent application Ser. No. 579,375, Griswold et al, filed May 21, 1975, U.S. Pat. No. 3,994,128, and which is assigned to the assignee of the present invention. As is well known in the art, the pumping capability of a fan or propeller can be varied by changing the pitch of the fan blades, i.e., rotating the blades in unison about their radial axes. Thus, the inlet Mach number may be increased by varying the pitch of the fan blades in conjunction with, or instead of, changing fan rotational speed. In either case, the excursion would be along a path such as B – D of FIGS. 4 and 5 resulting in a higher inlet Mach number. Though the shear noise reduction is slightly compromised, this is more than offset by the reduction in inlet forward propagating noise. Once the engine cycle parameters are established, it becomes possible to schedule the nozzle area and inlet Mach number variations in such a predetermined relationship as to produce a reduction in engine thrust and noise. Such scheduling may be accomplished by any of several known control schemes.

Figure 3:
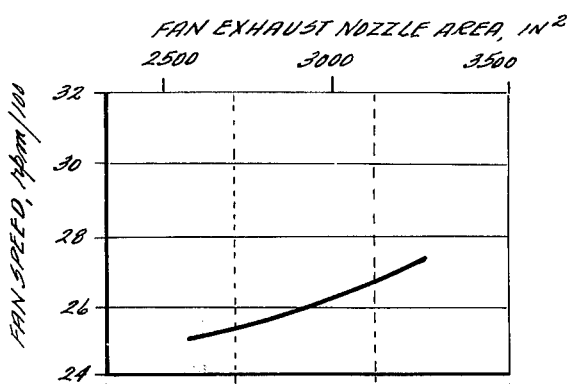
FIG. 3 is a series of graphs depicting significant engine parameters during engine operation according to the improved method of the present invention.
Figure 3:
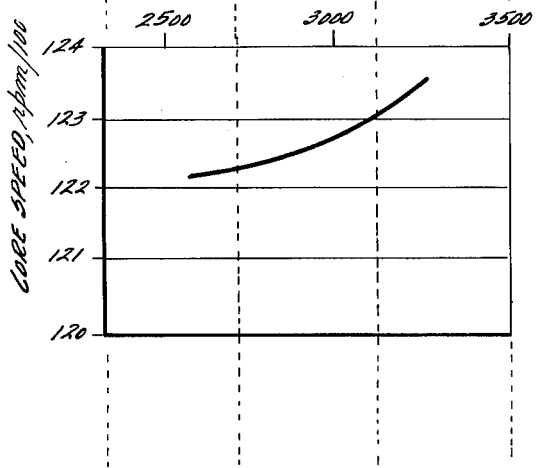
Figure 3:
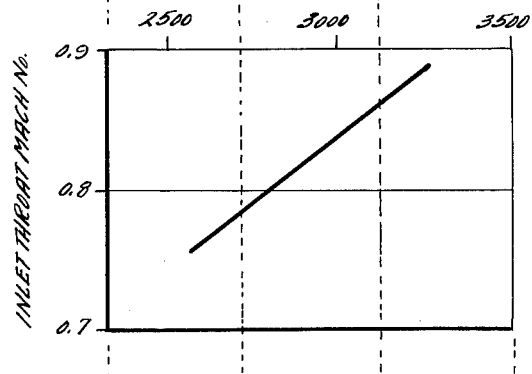
Figure 3:
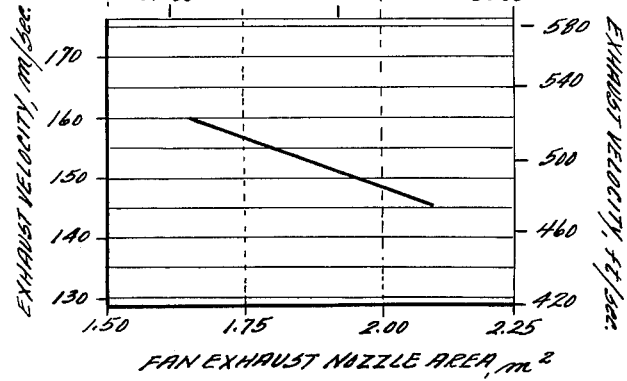

The present invention also offers the possibility of maintaining a given engine thrust level while simultaneously reducing engine noise. For example, where limited fan speed excursions above the design point are possible, the increased flow associated therewith could compensate for the reduced velocity associated with opening the fan nozzle. Consider FIG. 3 wherein is graphically depicted certain characteristics of several significant turbofan parameters as fan nozzle area is increased while holding engine net thrust constant. As shown first in FIGS. 3A and 3B, as fan nozzle exhaust area is increased, fan and core engine speed (rpm) both increase through a throttle advance to hold thrust. This is necessary since an increased airflow is required to offset the reduced exhaust velocity. The increased airflow results in an increased inlet Mach number as depicted in FIG. 3C since the inlet is of a fixed area variety. This greatly enhances inlet noise attenuation as previously discussed. Furthermore, in spite of the increased airflow, fan exhaust nozzle exit velocity is decreased (FIG. 3D) since the increased fan nozzle area more than compensates for the increased airflow due to the throttle advance. Thus, a method of reducing noise in a gas turbofan engine while holding thrust constant would include the steps of increasing the fan nozzle area and increasing fan airflow as through a fan rotational speed increase.

It should be obvious to one skilled in the art that certain changes can be made to the above-described invention without departing from the broad inventive concepts thereof. For example, though the preferred embodiment depicts increasing fan nozzle area by means of variable position flaps, other known schemes could be employed. These include translating flaps, blow-out doors, etc. It is intended that the appended claims cover these and all other variations in the present invention's broader inventive concepts.

Having thus described the invention, what is considered novel and desired to be secured by Letters Patent of the United States is:

1. A method of operating an aircraft gas turbofan engine in a forward flight mode including the steps of:
   pressurizing air flowing through a stage of rotating fan blades disposed within an inlet duct;
   passing a portion of the air through an annular bypass duct of generally fixed geometry;
   discharging said portion through a nozzle of the type having a generally constant inlet area and variable exit area; and
   modulating the nozzle exit area from a first value associated with a flight cruise operating condition which is convergent with respect to the nozzle inlet to a second value which is at least five percent greater than the first value, thereby reducing engine thrust and noise; and wherein fan blade rotational speed is essentially constant.

2. A method of operating an aircraft gas turbofan engine in a forward flight mode including the steps of:
   pressurizing air flowing through a stage of rotating fan blades disposed within an inlet duct;
   passing a portion of the air through an annular bypass duct of generally fixed geometry;
   discharging said portion through a nozzle of the type having a generally constant inlet area and variable exit area; and
   modulating the nozzle exit area from a first value associated with a flight cruise operating condition which is convergent with respect to the nozzle inlet to a second value which is at least five percent greater than the first value, thereby reducing engine thrust and noise; and wherein the inlet duct Mach number is essentially constant.

3. A method of operating an aircraft gas turbofan engine in a forward flight mode including the steps of:
   pressurizing air flowing through a stage of rotating fan blades disposed within an inlet duct;
   passing a portion of the air through an annular bypass duct of generally fixed geometry;
   discharging said portion through a nozzle of the type having a generally constant inlet area and variable exit area;
   modulating the nozzle exit area from a first value associated with a flight cruise operating condition which is convergent with respect to the nozzle inlet to a second value which is at least five percent greater than the first value; and
   increasing the Mach number of the air flowing through the inlet duct, thereby reducing forward propagating noise.

4. The method of claim 3 wherein the increase in Mach number is accomplished by increasing fan blade rotational speed.

5. The method of claim 3 wherein the increase in Mach number is accomplished by changing the pitch of the fan blades.

6. A method of operating an aircraft gas turbofan engine in a forward flight mode including the steps of:
pressurizing air flowing through a stage of rotating fan blades disposed within an inlet duct;
passing a portion of the air through an annular bypass duct of generally fixed geometry;
discharging said portion through a nozzle of the type having a generally constant inlet area and variable exit area; and
modulating the nozzle exit area from a first value associated with a flight cruise operating condition which is convergent with respect to the nozzle inlet to a second value associated with a landing approach operating condition which is at least five percent greater than the first value, thereby reducing engine thrust and noise.

7. The method of claim 6 wherein the second value of nozzle exit area is generally between five and thirty percent greater than the first value of nozzle exit area.

8. The method of claim 6 wherein the first value of nozzle exit area is established such that the flow area converges approximately thirty percent from the inlet to the exit of the variable area nozzle and wherein the second value of nozzle exit area is established such that the flow area distribution through the variable area nozzle is substantially constant.

9. The method of claim 8 wherein the second value of nozzle exit area is established such that the flow area distribution through the variable area nozzle is divergent to the extent that the airflow is diffused without separation within the nozzle.

* * * * *